B. G. LAMME.
MEANS FOR PREVENTING COMMUTATOR FLASHING.
APPLICATION FILED JUNE 17, 1918. RENEWED JULY 9, 1921.
1,392,182.
Patented Sept. 27, 1921.
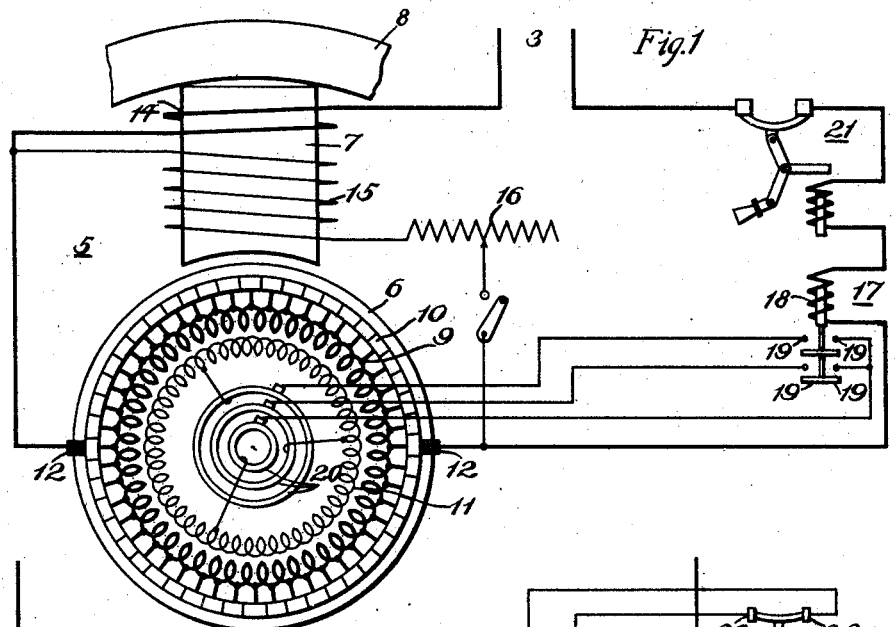
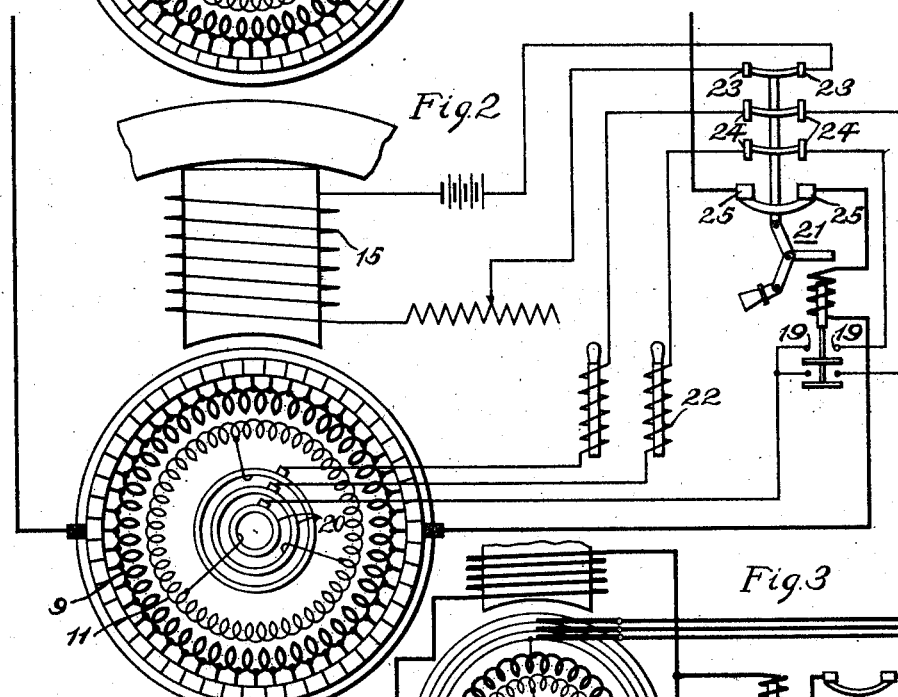
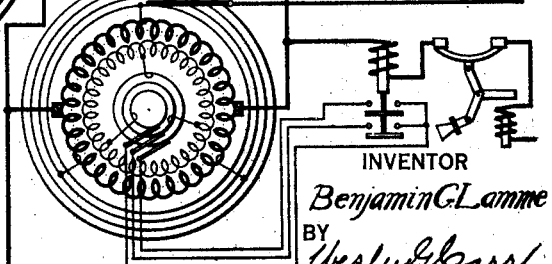
WITNESSES:
W. S. Reece
D. C. Davis
INVENTOR
Benjamin G. Lamme
BY
Wesley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

MEANS FOR PREVENTING COMMUTATOR-FLASHING.

1,392,182.          Specification of Letters Patent.     Patented Sept. 27, 1921.

Application filed June 17, 1918, Serial No. 240,422. Renewed July 9, 1921. Serial No. 483,610.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Means for Preventing Commutator-Flashing, of which the following is a specification.

My invention relates to means for minimizing or preventing flashing in dynamo-electric machines of the commutator type, and it has for its object to provide apparatus of the character designated that shall be simple and inexpensive to install and highly effective in operation.

In the accompanying drawing, Figure 1 is a diagrammatic view of a direct-current generator, together with attendant load and exciting circuits and auxiliary apparatus embodying one form of my invention; Fig. 2 is a view similar to Fig. 1 and embodying a modification of the system therein shown; Fig. 3 is a diagrammatic illustration of my invention as applied to a rotary converter, and Fig. 4 is a detail sectional view illustrating one method of applying an auxiliary energy-absorbing and dissipating winding to a machine embodying my invention.

In a copending application of Norman W. Storer, Serial No. 203,527, filed Nov. 23, 1917, and assigned to the Westinghouse Electric & Manufacturing Company, is disclosed means whereby, upon the occurrence of a current overload in a direct-current generator, a plurality of points in the armature winding thereof are automatically interconnected. By this means, the energy inductively interlinked with the armature winding is immediately dissipated by the flow of circulating currents in the closed circuit thus formed and the potentials of all the commutator bars are at once brought to substantially the same value. At the same time, the phase of the current flow thus established in the armature is such as to promptly suppress the exciting field of the machine. By both of these actions, the tendency to initiate and maintain sparking and flash-overs at the commutator is radically minimized or entirely suppressed and thus satisfactory operation is insured, even with extremely high-voltage apparatus.

In further embodiments of the aforementioned invention, means are shown for closing the short-circuit path through an inductive reactor and also means for automatically opening the field circuit and for subsequently opening the armature short-circuit path.

In another copending application of Norman W. Storer, Serial No. 222,083, filed March 13, 1918, and assigned to the Westinghouse Electric & Manufacturing Company, is disclosed an application of the same inventive concept to rotary converters.

The particular field of application of the above-described inventions is in high-voltage apparatus, wherein the tendency to flash-overs is a maximum and I find that, under certain conditions, difficulties are encountered in successively interconnecting and disconnecting points in high-voltage windings of this nature. Substantially equivalent spark-suppressing and flash-over results may be secured, however, by applying an auxiliary winding to the armature of a dynamo-electric machine and by performing the short-circuiting operations upon said auxiliary winding, rather than upon the main winding. The auxiliary winding should preferably be closely inductively interlinked with the main armature winding as, for example, by being wound in the same slots therewith and by having the same distribution, in order that there may be a prompt energy transfer from one winding to the other.

Referring to the drawing for a more detailed understanding of my invention, I show a direct-current generator at 5 in Fig. 1, said generator embodying an armature 6 and an exciting field pole 7 supported by a yoke member 8. The armature 6 carries a main winding 9, connected to a commutator member 10, and also an auxiliary armature winding 11, preferably disposed in the same slots as the winding 9, as is indicated in Fig. 4. Load current is taken from the commutator member 10 by suitable brushes 12 and supplied to a load circuit 13. The field pole 7 is excited by a series-type winding 14 and a shunt-type winding 15, the current in the latter being adjusted by a resistor 16.

A relay 17, which is provided for the flash-over-suppressing function, comprises an actuating winding 18 inserted in one of the load mains and fixed contact members 19 arranged to be interconnected when the current in the winding 18 exceeds a predetermined amount. The contact members 19 are connected also to auxiliary slip rings 20—20, mounted on the shaft of the armature 6, by suitable brushes, and the slip rings 20 are connected to spaced points of different potential in the auxiliary winding 17.

Having thus described the arrangement of a system embodying my invention, the operation is as follows: under normal conditions, the sum of the electromotive forces set up in the winding 11 is equal to zero and no current flows therein, the winding 9 functioning as in the ordinary direct-current generator. Upon the occurrence of a current overload, the relay 17, which is designed to be very quick-acting, closes and interconnects the slip rings 20—20, thereby establishing a circuit between points of different potential in the winding 11 and permitting the flow of heavy short-circuit currents therein. The energy of this inductive flow of current is derived inductively from the main winding 9 and thus the energy inductively interlinked with the main armature winding is quickly dissipated. At the same time, the flow of current in the winding 11 is of such magnitude and phase as to establish a field in substantial opposition to the field of the pole 7, whereby substantially all tendency to develop sparking electro-motive forces around the commutator member 10 is eliminated.

Within a brief period of time, the usual load circuit-breaker 21 opens, disconnecting the machine without difficulty, because of the greatly reduced voltage of the machine.

The winding 11, while preferably having a similar distribution to that of the main winding 9, need not have as many turns as the main winding and thus the electromotive forces involved in the short-circuiting operation need not be nearly so great as in performing the same function with the main winding.

The general arrangement of the system of Fig. 2 is the same as that of Fig. 1 except that the short-circuit of the auxiliary armature winding is established through an inductive reactor 22 in order to still further modify the phase of the short-circuit currents. Furthermore, the breaker 21 is arranged to first interconnect the slip rings 20—20, as through contact members 19—19, and to substantially simultaneously open the field circuit at contact members 23—23. Finally, the connection between the slip rings 20—20 is broken, as at contact members 24—24, at the instant the main circuit is broken, as at the contact members 25—25.

The system of Fig. 3 shows the application of an auxiliary winding to the armature of a rotary converter, said auxiliary winding being short-circuited in a similar manner and for a similar purpose as in the previous systems.

In the drawing, I have indicated the auxiliary armature winding as of the closed-coil type, for simplicity and clearness, but said winding may assume any of the well known types of alternating-current windings without departing from the spirit and scope of my invention.

While I have shown my invention in a plurality of forms, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a dynamo-electric machine of the commutator type provided with a main armature winding connected to the commutator and an auxiliary armature winding, of means for interconnecting a plurality of points of different potential in said auxiliary winding upon the passage of abnormal current through said main winding.

2. The combination with a dynamo-electric machine of the commutator type provided with a main armature winding connected to the commutator and an auxiliary armature winding, of means for interconnecting a plurality of points of different potential in said auxiliary winding through an impedance device upon the passage of abnormal current through said main winding.

3. The combination with a dynamo-electric machine of the commutator type provided with a main armature winding connected to the commutator and with an auxiliary armature winding, of means for interconnecting a plurality of points of different potential in said auxiliary winding upon the passage of abnormal current through said main winding, and means for opening said interconnection upon the cessation of said current flow.

4. The combination with a dynamo-electric machine of the commutator type provided with a main armature winding connected to the commutator and with an auxiliary armature winding, of means for interconnecting points of differing potential in said auxiliary winding upon the flow of abnormal current in said main winding, means for opening the load circuit of said machine upon said flow of abnormal current, and means operative by the action of said circuit-opening means to open said interconnection.

5. The combination with a direct-current generator provided with a main armature winding connected to the commutator and with an auxiliary armature winding, of a load circuit connected to said main armature winding, and means for interconnecting at least one pair of points of substantially opposite polarity in said auxiliary winding upon abnormal current flow in said circuit.

6. The combination with a direct-current generator provided with a main armature winding connected to the commutator and with an auxiliary armature winding wound in the same slots as said main winding, of a load circuit connected to said main armature winding, and means for interconnecting at least one pair of points of substantially opposite polarity in said auxiliary winding upon abnormal current flow in said circuit.

7. The combination with a direct-current generator provided with main and auxiliary armature windings, of a load circuit connected to said main armature winding, auxiliary slip rings upon the armature of said generator and connected to points of differing potential in said auxiliary winding, a relay device actuated in accordance with the current in said load circuit, and means whereby said relay device interconnects said auxiliary slip rings upon the flow of an abnormal amount of current in said load circuit.

8. The combination with a direct-current generator provided with main and auxiliary armature windings, of a load circuit breaker inserted in said load circuit, and means whereby said circuit-breaker, at the outset of its automatic operation upon overload, interconnects at least two points of radically different potential in said auxiliary winding.

9. The combination with a direct-current generator provided with main and auxiliary armature windings having similar distributions, of a load circuit connected thereto, an overload circuit-breaker inserted in said load circuit and means whereby said circuit-breaker, at the outset of its automatic operation upon overload, interconnects at least two points of radically different potential in said auxiliary winding.

10. The combination with a direct-current generator provided with main and auxiliary armature windings, of a load circuit connected thereto, an overload circuit-breaker inserted in said load circuit, and means whereby said circuit breaker, at the outset of its automatic operation upon overload, interconnects at least two points of radically different potential in said auxiliary winding and further means whereby said circuit-breaker, at the conclusion of its operation, opens said interconnection.

11. The combination with a dynamo-electric machine of the commutator type provided with main and auxiliary armature windings and with a field winding, of a load circuit connected to said main winding, and means for interconnecting a plurality of points of differing potential in said auxiliary winding upon the passage of abnormal current through said main winding and for substantially simultaneously opening the field circuit of said machine.

In testimony whereof I have hereunto subscribed my name this 29th day of May, 1918.

BENJ. G. LAMME.